United States Patent
Huang

(10) Patent No.: US 11,582,373 B2
(45) Date of Patent: Feb. 14, 2023

(54) IMAGE CAPTURING APPARATUS AND METHOD, STORAGE MEDIUM AND ELECTRONIC EQUIPMENT

(71) Applicant: Shanghai Harvest Intelligence Technology Co., Ltd., Shanghai (CN)

(72) Inventor: Jiandong Huang, Shanghai (CN)

(73) Assignee: Shanghai Harvest Intelligence Technology Co., Ltd., Shanghai (CN)

( * ) Notice: Subject to any disclaimer, the term of this patent is extended or adjusted under 35 U.S.C. 154(b) by 153 days.

(21) Appl. No.: 16/869,318

(22) Filed: May 7, 2020

(65) Prior Publication Data

US 2020/0358934 A1    Nov. 12, 2020

(30) Foreign Application Priority Data

May 8, 2019 (CN) .......................... 201910380813.0
May 14, 2019 (CN) .......................... 201910402190.2
Sep. 27, 2019 (CN) .......................... 201910924125.6
Sep. 27, 2019 (CN) .......................... 201921638111.X

(51) Int. Cl.
     *H04N 5/225*      (2006.01)
(52) U.S. Cl.
     CPC ................................ *H04N 5/2256* (2013.01)

(58) Field of Classification Search
CPC .......................... H04N 5/2256; G06V 40/1335
See application file for complete search history.

(56) References Cited

U.S. PATENT DOCUMENTS

| | | | |
|---|---|---|---|
| 6,444,969 B2* | 9/2002 | Johnson | G06V 40/13 250/556 |
| 6,956,608 B1* | 10/2005 | Shapiro | G06V 40/1324 348/370 |
| 10,460,188 B2* | 10/2019 | Wu | H01L 27/14629 |
| 10,691,915 B2* | 6/2020 | Fourre | G06V 40/1394 |
| 10,963,671 B2* | 3/2021 | Pi | A61B 5/1172 |

* cited by examiner

*Primary Examiner* — Seung C Sohn
(74) *Attorney, Agent, or Firm* — Harness, Dickey & Pierce, P.L.C.

(57) ABSTRACT

An image capturing apparatus and method, a storage medium, and an electronic equipment are provided. The image capturing apparatus includes: a nonopaque cover plate having a first surface and a second surface opposite to each other in a thickness direction of the nonopaque cover plate, wherein the first surface of the nonopaque cover plate is opposite to an object to be captured; a light source module having a first surface and a second surface opposite to each other in a thickness direction of the light source module, wherein the first surface of the light source module is opposite to the second surface of the nonopaque cover plate; and a sensor module disposed on the second surface of the light source module.

24 Claims, 12 Drawing Sheets

Acquiring images respectively captured by the plurality of sensor components, wherein each image is a partial image of the object to be captured — S201

Stitching the acquired images to obtain the image of the object to be captured — S202

FIG. 8

Determining a position of the image captured by each sensor component in the image of the object to be captured according to a position of each sensor component in the plane — S2021

Stitching the images respectively captured by the plurality of sensor components according to the determined position to obtain the image of the object to be captured — S2022

FIG. 9

Acquiring a plurality of images of the object to be captured which are respectively stitched during the plurality of capturing periods, wherein there is a preset offset in a first direction between a position of the image of the object to be captured which is stitched in a current capturing period and a position of the image of the object to be captured which is stitched in a previous capturing period, the first direction is parallel to a shifting direction of the part of the plurality of optical elements that emit light ⟶ S2023

Determining the image of the object to be captured which is stitched in each capturing period as a to-be-processed image ⟶ S2024

Shifting a plurality of to-be-processed images in a second direction to align the plurality of to-be-processed images and obtain a processed image, wherein the second direction is consistent with the first direction ⟶ S2025

Generating a target image of the object to be captured based on the processed image ⟶ S2026

FIG. 10

IMAGE CAPTURING APPARATUS AND METHOD, STORAGE MEDIUM AND ELECTRONIC EQUIPMENT

CROSS-REFERENCE TO RELATED APPLICATIONS

The present application claims the benefit of priority to Chinese patent application No. 201910380813.0, filed on May 8, 2019, Chinese patent application No. 201910402190.2, filed on May 14, 2019, Chinese patent application No. 201910924125.6, filed on Sep. 27, 2019, and Chinese patent application No. 201921638111.X, filed on Sep. 27, 2019, the entire disclosures of which are incorporated herein by reference.

TECHNICAL FIELD

The present disclosure relates to the technical field of image capturing, and more particularly to an image capturing apparatus and method, a storage medium and an electronic equipment.

BACKGROUND

With the development of information technology, biometric technology plays an increasingly important role in ensuring information security, among which fingerprint identification has become one of the key technologies widely used in the field of mobile internet for identity recognition and device unlocking.

In the trend of larger and larger screen-to-body ratio of intelligent devices, a traditional capacitive fingerprint identification technology has been unable to meet the demand, while ultrasonic fingerprint identification technology has problems in technology maturity and cost, so an optical fingerprint identification technology is promising to become a mainstream technology scheme of fingerprint identification.

An existing optical fingerprint identification scheme is based on the imaging principle of geometric optical lens. Generally, a fingerprint module includes components such as a microlens array, an optical spatial filter and so on, which have many disadvantages such as complex structure, thick module, small sensing range and high cost, etc.

Compared with the existing optical fingerprint identification scheme, a non-lens optical fingerprint identification technology based on the total reflection imaging principle of physical optics has the advantages of simple structure, thin module, large sensing range and low cost, etc.

However, the existing non-lens optical fingerprint identification technology needs to be further improved.

SUMMARY

Embodiments of the present disclosure provide an improved image capturing apparatus and method.

Embodiments of the present disclosure provide an improved image capturing apparatus and method, which can realize large-area imaging, meet the requirements of intelligent devices for large-size screens, maintain high data processing speed, and improve fingerprint collection efficiency.

An embodiment of the present disclosure provides an image capturing apparatus, including: a nonopaque cover plate having a first surface and a second surface opposite to each other in a thickness direction of the nonopaque cover plate, wherein the first surface of the nonopaque cover plate is opposite to an object to be captured; a light source module having a first surface and a second surface opposite to each other in a thickness direction of the light source module, wherein the first surface of the light source module is opposite to the second surface of the nonopaque cover plate; and a sensor module disposed on the second surface of the light source module.

In some embodiments, the sensor module includes a plurality of sensor components, and the plurality of sensor components are disposed on a same plane.

In some embodiments, adjacent edges of adjacent sensor components of the plurality of sensor components are attached to each other.

In some embodiments, the image capturing apparatus further includes a scattering layer, covering the second surface of the light source module for scattering an incident light.

In some embodiments, the scattering layer is made of a material including an optical adhesive filled with scattering particles.

In some embodiments, each scattering particle has a diameter less than one fifteenth of a wavelength of the incident light.

In some embodiments, the sensor module includes a plurality of photosensitive units, and each photosensitive unit includes a plurality of photosensitive areas configured to be sensitive to light in a plurality of wave bands.

In some embodiments, each photosensitive unit includes a red light sensitive area, a green light sensitive area, and a blue light sensitive area.

In some embodiments, the sensor module includes a thin film transistor sensor, and the blue light sensitive area has an area larger than that of any of the red light sensitive area and the green light sensitive area.

In some embodiments, the light source module includes a plurality of optical elements arranged in an array, a part of the plurality of optical elements that emit light are shifted during different capturing periods, and the part of the plurality of optical elements sequentially emit light in each capturing period.

Another embodiment provides an image capturing method applying an image capturing apparatus. The image capturing apparatus includes: a nonopaque cover plate having a first surface and a second surface opposite to each other in a thickness direction of the nonopaque cover plate, wherein the first surface of the nonopaque cover plate is opposite to an object to be captured; a light source module having a first surface and a second surface opposite to each other in a thickness direction of the light source module, wherein the first surface of the light source module is opposite to the second surface of the nonopaque cover plate; and a sensor module disposed on the second surface of the light source module. The image capturing method includes: driving the light source module to emit light, the light being totally reflected by the nonopaque cover plate; and collecting, by the sensor module, the light that is totally reflected by the nonopaque cover plate to acquire an image of the object to be captured.

In some embodiments, the sensor module includes a plurality of sensor components, and acquiring an image of the object to be captured by the sensor module includes: acquiring images respectively captured by the plurality of sensor components, wherein each image is a partial image of the object to be captured; and stitching the acquired images to obtain the image of the object to be captured.

In some embodiments, the second surface of the light source module is covered with a scattering layer, and the scattering layer is configured to scatter an incident light.

In some embodiments, driving the light source module to emit light includes: turning on optical elements disposed in a plurality of discrete light source areas of the light source module, wherein the plurality of discrete light source areas are arranged in an array and separated by optical elements that do not emit light; acquiring the image captured by the sensor module includes: collecting, by the sensor module, the light that is totally reflected by the nonopaque cover plate from the optical elements that are turned on, wherein each photosensitive unit in the sensor module is configured to be sensitive to light in a plurality of wave bands; shifting the plurality of discrete light source areas after a preset time interval, turning on the optical elements in the plurality of discrete light source areas of the light source module iteratively, and collecting, by the sensor module, the light that is totally reflected by the nonopaque cover plate from the optical elements that are turned on until the shifting meets a preset number of times.

In some embodiments, the plurality of sensor components are disposed on a same plane, and stitching the acquired images to obtain the image of the object to be captured includes: determining a position of the image captured by each sensor component in the image of the object to be captured according to a position of each sensor component in the plane; and stitching the images respectively captured by the plurality of sensor components according to the determined position to obtain the image of the object to be captured.

In some embodiments, the plurality of sensor components capture the images when the light source module emits light, wherein the light source module includes a plurality of optical elements arranged in an array, a part of the plurality of optical elements that emit light are shifted during different capturing periods, and the part of the plurality of optical elements sequentially emit light in each capturing period; stitching the acquired images to obtain the image of the object to be captured further includes: acquiring a plurality of images of the object to be captured which are respectively stitched during the plurality of capturing periods, wherein there is a preset offset in a first direction between a position of the image of the object to be captured which is stitched in a current capturing period and a position of the image of the object to be captured which is stitched in a previous capturing period, and the first direction is parallel to a shifting direction of the part of the plurality of optical elements that emit light; determining the image of the object to be captured which is stitched in each capturing period as a to-be-processed image; shifting a plurality of to-be-processed images in a second direction to align the plurality of to-be-processed images and obtain a processed image, wherein the second direction is consistent with the first direction; and generating a target image of the object to be captured based on the processed image.

In some embodiments, generating a target image of the object to be captured based on the processed image includes: determining whether an integrity of the processed image reaches a preset threshold value; performing image capturing in a next capturing period and shifting the image captured in the next capturing period in the second direction to align the image captured in the next capturing period with the processed image, to obtain an updated processed image, when the integrity of the processed image is less than the preset threshold value, until an integrity of the updated processed image reaches the preset threshold value; and determining the updated processed image as the target image of the object to be captured.

In some embodiments, the sensor module includes a plurality of sensor components, and the image capturing method further includes: determining whether an integrity of the image of the object to be captured reaches a preset threshold value; determining a sensor component of the sensor module corresponding to a blank area in the image of the object to be captured when the integrity of the image of the object to be captured is less than the preset threshold value; and acquiring the image captured by the sensor component corresponding to the blank area in a next capturing period and stitching the acquired image with the image of the object to be captured to obtain an updated image of the object to be captured until the integrity of the image of the object to be captured reaches the preset threshold value.

Another embodiment of the present disclosure provides a storage medium having computer instructions stored thereon, wherein the computer instructions are executed to perform steps of the image capturing method.

Another embodiment of the present disclosure provides an electronic equipment including a memory having computer instructions stored thereon and a processor, wherein the computer instructions are executed by the processor to perform steps of the image capturing method.

Compared with conventional technologies, embodiments of the present disclosure have following beneficial effects.

According to an embodiment of the present disclosure, the image capturing apparatus includes: a nonopaque cover plate having a first surface and a second surface opposite to each other in a thickness direction of the nonopaque cover plate, wherein the first surface of the nonopaque cover plate is disposed opposite to an object to be captured; a light source module having a first surface and a second surface opposite to each other in a thickness direction of the light source module, wherein the first surface of the light source member is disposed opposite to the second surface of the nonopaque cover plate; and a sensor module disposed on the second surface of the light source module.

Further, the sensor module includes a plurality of sensor components, and the plurality of sensor components are disposed on a same plane. With the solution according to embodiments of the present disclosure, large-area imaging can be realized by the plurality of small-area sensor components to meet the requirements for large-size screens of the intelligent devices with high data processing speed and it is beneficial to reduce manufacturing and maintenance costs. Specifically, the plurality of sensor components according to embodiments of the present disclosure can effectively make up for shortages of existing production capacity that cannot produce a single large-size sensor module. By flexibly adjusting the number of the plurality of sensor components according to the screen-to-body ratio of the intelligent devices, the image capturing apparatus according to embodiments of the present disclosure can effectively meet the requirements for large-size screens of the intelligent devices. Furthermore, in the existing technology, since there is only one single sensor module, all pixels on the sensor module need to output data every time the captured image is output. As the area of the sensor module increases and the number of the pixels increases, such a one-time output method will inevitably lead to a decreasing in data processing speed. In the image capturing apparatus according to embodiments of the present disclosure, each sensor component can be independently controlled, so that each sensor component can output data simultaneously and in parallel, thereby effectively increasing the data processing speed of the image capturing apparatus. Further, in the existing technology, since there is only one single sensor module, even if a partial area of the sensor module is damaged, the whole sensor module needs to be replaced, which undoubtedly increases the manufacturing and maintenance costs of the image capturing apparatus. In the image capturing apparatus according to embodiments of the present disclosure, since the plurality of sensor components may be coupled together, when a partial area is damaged, only the damaged sensor component needs to be replaced, thereby effectively reducing the manufacturing and maintenance costs of the image capturing apparatus.

Further, the image capturing apparatus includes a scattering layer covering the second surface of the light source module, and the scattering layer is configured to scatter an incident light. Compared with the existing image capturing apparatus, the image capturing apparatus according to embodiments of the present disclosure can effectively prevent secondary total reflection and ensure that a signal light (an incident light carrying fingerprint information) can be successfully incident on the sensor module. Specifically, the scattering layer can effectively reduce the chance of total reflection of the incident light on the second surface of the light source module, thereby making it possible to prevent secondary total reflection.

Further, the sensor module includes a plurality of photosensitive units, and each photosensitive unit includes a plurality of photosensitive areas configured to be sensitive to light in a plurality of wave bands. Specifically, each photosensitive unit includes a red light sensitive area, a green light sensitive area, and a blue light sensitive area. By setting the plurality of photosensitive areas in each photosensitive unit, the image capturing apparatus can capture multiple images at the same time in a single imaging process. Compared with the existing technology in which only a single image can be captured in a single imaging, the number of times for image capturing can be reduced when capturing a complete fingerprint image, and a complete fingerprint image can be obtained more quickly, which improves the efficiency of fingerprint collection.

BRIEF DESCRIPTION OF THE DRAWINGS

FIG. 8 is a flowchart of a specific embodiment of S200 in the image capturing method in FIG. 6;

FIG. 9 is a flowchart of a specific embodiment of S202 in FIG. 8;

FIG. 10 is a flowchart of another specific embodiment of S202 in FIG. 8;

DETAILED DESCRIPTION

With the increasing improvement of screen-to-body ratio of intelligent devices, as well as the proposal of the concept of full screen equipment and the advent of full screen products, the production capacity of existing optical under-screen fingerprint identification device based on the principle of total reflection cannot meet the requirements on the full screens of the intelligent devices.

An embodiment of the present disclosure provides an image capturing apparatus. Specifically, the image capturing apparatus includes: a nonopaque cover plate having a first surface and a second surface opposite to each other in a thickness direction of the nonopaque cover plate, wherein the first surface of the nonopaque cover plate is disposed opposite to an object to be captured; a light source module having a first surface and a second surface opposite to each other in a thickness direction of the light source module, wherein the first surface of the light source module is disposed opposite to the second surface of the nonopaque cover plate; and a sensor module disposed on the second surface of the light source module.

In order to make above objects, features and advantages of the present disclosure more obvious and understandable, specific embodiments of the present disclosure will be described in detail below in combination with the attached drawings.

Figure 1:
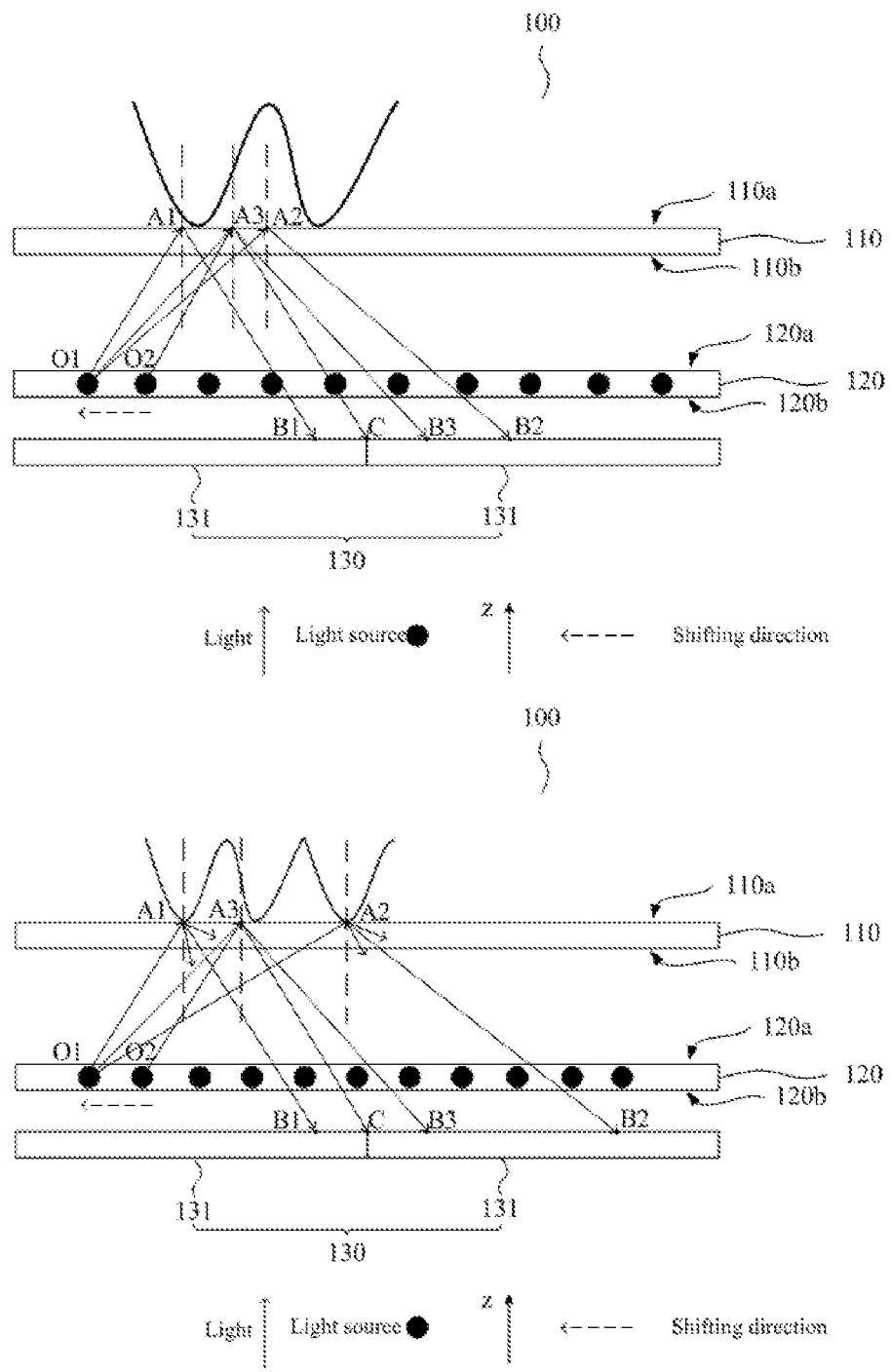
FIG. 1 is a schematic view of an image capturing apparatus according to an embodiment of the present disclosure.

FIG. 1 is a schematic view of an image capturing apparatus according to an embodiment of the present disclosure. The image capturing apparatus 100 may be an optical under-screen image capturing apparatus, such as an optical under-screen fingerprint collection apparatus based on the principle of optical total reflection.

The image capturing apparatus 100 may be suitable for capturing an image of an object to be captured, the object to be captured may be a finger, and the image may be a fingerprint image.

Specifically, referring to FIG. 1, the image capturing apparatus 100 may include: a nonopaque cover plate 110, a light source module 120 and a sensor module 130. The nonopaque cover plate 110 has a first surface 110a and a second surface 110b opposite to each other in a thickness direction (in z direction as shown), and the first surface 110a of the nonopaque cover plate 110 is opposite to the object to be captured. The light source module 120 has a first surface 120a and a second surface 120b in a thickness direction (in z direction as shown), and the first surface 120a of the light source module faces the second surface 110b of the nonopaque cover plate 110. The sensor module 130 is disposed on the second surface 120b of the light source module 120.

For example, the sensor module 130 may be attached to the second surface 120b of the light source module 120. In some embodiments, the sensor module 130 may be attached to the second surface 120b of the light source module 120 by an optical adhesive. Specifically, the optical adhesive may be an optical clear adhesive (OCA).

Alternatively, there may be a gap between the sensor module 130 and the second surface 120b of the light source module 120.

Further, the sensor module 130 may be formed by a plurality of sensor components 131, and the plurality of sensor components 131 may be disposed on a same plane. The plane may be parallel to the second surface 120b of the light source module 120, that is, the plane may be perpendicular to the z direction. In some embodiments, the plurality of sensor components may be coupled with each other.

Figure 2:
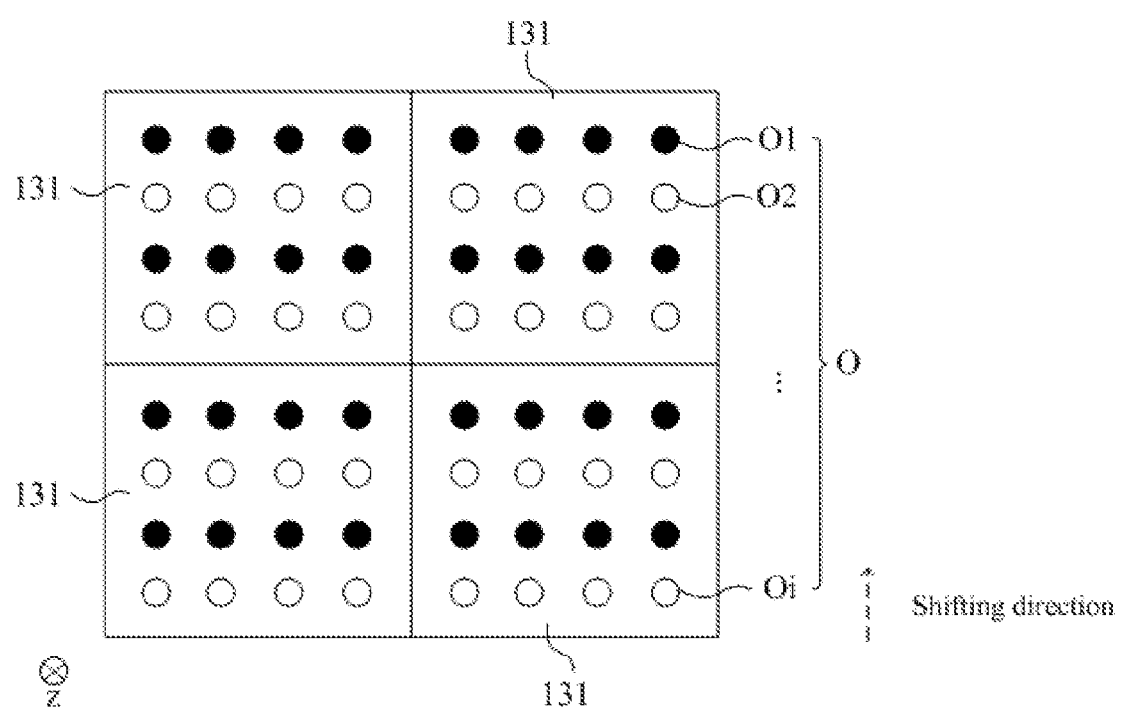
FIG. 2 is a schematic view of a sensor module in FIG. 1.

For example, the sensor module 130 may include four sensor components 131, and a coupling effect of the four sensor components 131 on the plane is shown in FIG. 2.

In some embodiments, the sensor component 131 may be circular, rectangular, polygonal, etc.

In some embodiments, the plurality of sensor components 131 of the sensor module 130 may have the same shape and area. For example, the four sensor components 131 shown in FIG. 2 are all rectangular and have equal area.

In some embodiments, one or more sensor components in the plurality of sensor components 131 of the sensor module 130 may have different shape and/or area from other sensor components, so as to flexibly adapt to different screen-to-body ratio requirements of the intelligent devices.

In some embodiments, the plurality of sensor components 131 in the sensor module 130 may be coupled into a rectangle as shown in FIG. 2 in an array arrangement.

In some embodiments, according to the screen shape of the intelligent devices, the plurality of sensor components 131 may be coupled into polygon, triangle, circle and other contours.

In some embodiments, the number of the plurality of sensor components 131 may be determined according to the shape and area of the nonopaque cover plate 110 and the shape and area of each sensor component 131.

In some embodiments, in order to ensure that the image of the object to be captured can be captured completely, adjacent edges of adjacent sensor components 131 may be attached to each other.

For example, referring to FIGS. 1 and 2, the adjacent sensor components 131 may be attached snugly to ensure that there is no gap therebetween.

Further, the adjacent sensor components 131 may be bonded by means of an optical adhesive or the like to obtain a better bonding effect.

In some embodiments, the light source module 120 may include a plurality of optical elements O arranged in an array, a part of the plurality of optical elements O that emit light are shifted during different capturing periods, and the part of the plurality of optical elements O sequentially emit light in each capturing period.

For the convenience of expression, in the example shown in FIG. 2, the optical elements in the same row and emitting light at the same time are collectively referred to as optical elements Oi, wherein i is a positive integer. In FIG. 2, the optical elements O which are emitting light are represented by solid circles, and the optical elements O which are not emitting light are represented by hollow circles.

For example, a part of the plurality of optical elements O that emit light are shifted means emitting light line by line starting from the optical elements Oi until the optical elements O1 emit light.

For another example, referring to FIG. 2, in order to improve the efficiency of image capturing, a part of the plurality of optical elements O that emit light are shifted means that starting from the optical elements O1, two interlacing rows of optical elements separated by a row of optical elements emit light at the same time; in next capturing period, starting from the optical elements O2, two interlacing rows of optical elements separated by a row of optical elements emit light at the same time; and so on, until starting from the optical elements Oi, two interlacing rows of optical elements separated by a row of optical elements emit light at the same time.

For another example, a shifting direction of the optical elements may also be in the diagonal direction of the rectangle sensor component 131 as shown in FIG. 2. Thus, the optical elements O on both sides perpendicular to each other can emit light at the same time, which is conductive to capturing the image of the object to be captured in all directions.

In some embodiments, the light source module 120 may be a display panel, which can not only be used as a light source for emitting light, but also for displaying images. The display panel may include a liquid crystal display (LCD), an active-matrix organic light-emitting diode (AMOLED) display, or a micro light-emitting diode (micro-LED) display. The display panel can scan and drive a single pixel with a thin film transistor (TFT) structure, and can realize a single drive for pixels, that is, the drive and array display of the light source can be realized, and the light can enter the sensor module 130 through a gap between the pixels.

For, example, the display panel may be selected from: a liquid crystal display screen, an active-matrix organic light-emitting diode display screen and a micro light-emitting diode display screen.

In some embodiments, the nonopaque cover plate 110 may be made of glass material. The nonopaque cover plate 110 may be a single-layer cover plate or a multi-layer cover plate. The single-layer cover plate may be a glass cover plate or an organic light-transmitting material cover plate. The single-layer cover plate may also be a cover plate with other functions, such as a touch screen. The multi-layer cover plate may be a multi-layer glass cover plate or a multi-layer organic light-transmitting material cover plate or a combination of a glass cover plate and an organic light-transmitting material cover plate.

In some embodiments, the sensor component 131 may be a photoelectric sensor. The nonopaque cover plate 110 may perform imaging based on the total reflection principle of physical optics, and the image formed by the total reflection on the nonopaque cover plate 110 may be captured by the photoelectric sensor.

When the image capturing apparatus 100 is applied to optical under-screen fingerprint identification, the first surface 110a of the nonopaque cover plate 110 may be used to be contacted by a fingerprint, the second surface 110b of the nonopaque cover plate 110 may be provided with the light source module 120, which is adapted to transmit light signals in different directions towards the first surface 110a of the nonopaque cover plate 110, and the light signals are totally reflected on the first surface 110a of the nonopaque cover plate 110 to form total reflection light in different directions, and the total reflection light enters and is received by the sensor module 130 through the nonopaque cover plate 110 and the light source module 120. Since the intensity of the total reflection light is modulated by a fingerprint topography, the fingerprint image can be obtained by collecting the total reflection light emitted from the second surface 120b of the light source module 120.

For example, referring to FIG. 1, when a finger presses the first surface 110a of the nonopaque cover plate 110, according to the principle of total reflection, a light emitted from the optical element O1 can image point A1 to point B1 on the surface of the sensor component 131 on a left side in the figure. Similarly, another light emitted from the optical element O1 can image point A2 to point B2 on the surface of the sensor component 131 on a right side in the figure.

Thus, in a single capturing period, on the basis of meeting the total reflection conditions, the imaging of the light emitted from the optical element O on the sensor module 130 after the total reflection is distributed on the plurality of sensor components 131. That is, the image captured by each sensor component 131 is a partial image of the object to be captured. Further, a complete image of the object to be captured can be obtained by stitching the images captured by each sensor component 131.

With the solution according to embodiments of the present disclosure, large area imaging can be realized by coupling a plurality of small-area sensor components 131 to meet the requirements of intelligent devices for large-size screens, and the data processing speed is fast, which is beneficial to reduce the manufacturing and maintenance costs.

Specifically, the coupling of the plurality of sensor components according to embodiments of the present disclosure can effectively make up for shortages of existing production capacity that cannot produce a single large-size sensor module. By flexibly adjusting the number of the plurality of sensor components 131 according to the screen-to-body ratio of the intelligent devices, the image capturing apparatus 100 according to embodiments of the present disclosure can effectively meet the requirements for large-size screens of the intelligent devices.

Furthermore, in the existing technology, since there is only one single sensor module, all pixels on the sensor module need to output data every time the captured image is output. As the area of the sensor module increases and the number of the pixels increases, such a one-time output method will inevitably lead to a decreasing in data processing speed. In the image capturing apparatus 100 according to embodiments of the present disclosure, each sensor component 131 can be independently controlled, so that each sensor component 131 can output data simultaneously and in parallel, thereby effectively increasing the data processing speed of the image capturing apparatus 100.

Further, in the existing technology, since there is only one single sensor module, even if a partial area of the sensor module is damaged, the whole sensor module needs to be replaced, which undoubtedly increases the manufacturing and maintenance costs of the image capturing apparatus. In the image capturing apparatus 100 according to embodiments of the present disclosure, since the plurality of sensor components 131 may be coupled together, when a partial area is damaged, only the damaged sensor component 131 needs to be replaced, thereby effectively reducing the manufacturing and maintenance costs of the image capturing apparatus 100.

The existing optical under-screen fingerprint identification device has many defects. For example, in the optical under-screen fingerprint solution based on the principle of optical total reflection, there cannot be an air gap between a photoelectric sensor and an illumination light source, otherwise incident light carrying fingerprint information (also called as signal light) will have secondary total reflection inside the device and cannot successfully reach the photoelectric sensor, thereby affecting the fingerprint imaging quality. Specifically, in the existing optical under-screen fingerprint identification device based on principle of total reflection, an optical adhesive having a uniform refractive index is filled between the light source module and the sensor module to ensure that the incident light will not be reflected when it reaches the light source module. However, in the manufacturing process, due to process limitations, it is difficult to fit a sensor having a large area, and the optical adhesive may not completely fill all the gaps between the light source module and the sensor module. For example, when an air bubble is formed between the light source module and the sensor module, the incident light will be totally reflected at the position of the air bubble, so that this part of the incident light cannot successfully reach the sensor module, thereby resulting in a partial image loss of a target fingerprint image.

In order to solve above technical problem, another embodiment of the present disclosure provides an image capturing apparatus, which can effectively prevent secondary total reflection and ensure that the signal light can successfully enter the sensor module. Specifically, by providing a scattering layer, the probability of total reflection of the incident light on the second surface of the light source module is effectively reduced, and it is possible to prevent secondary total reflection by reducing the probability of formation of air bubbles.

Figure 3:
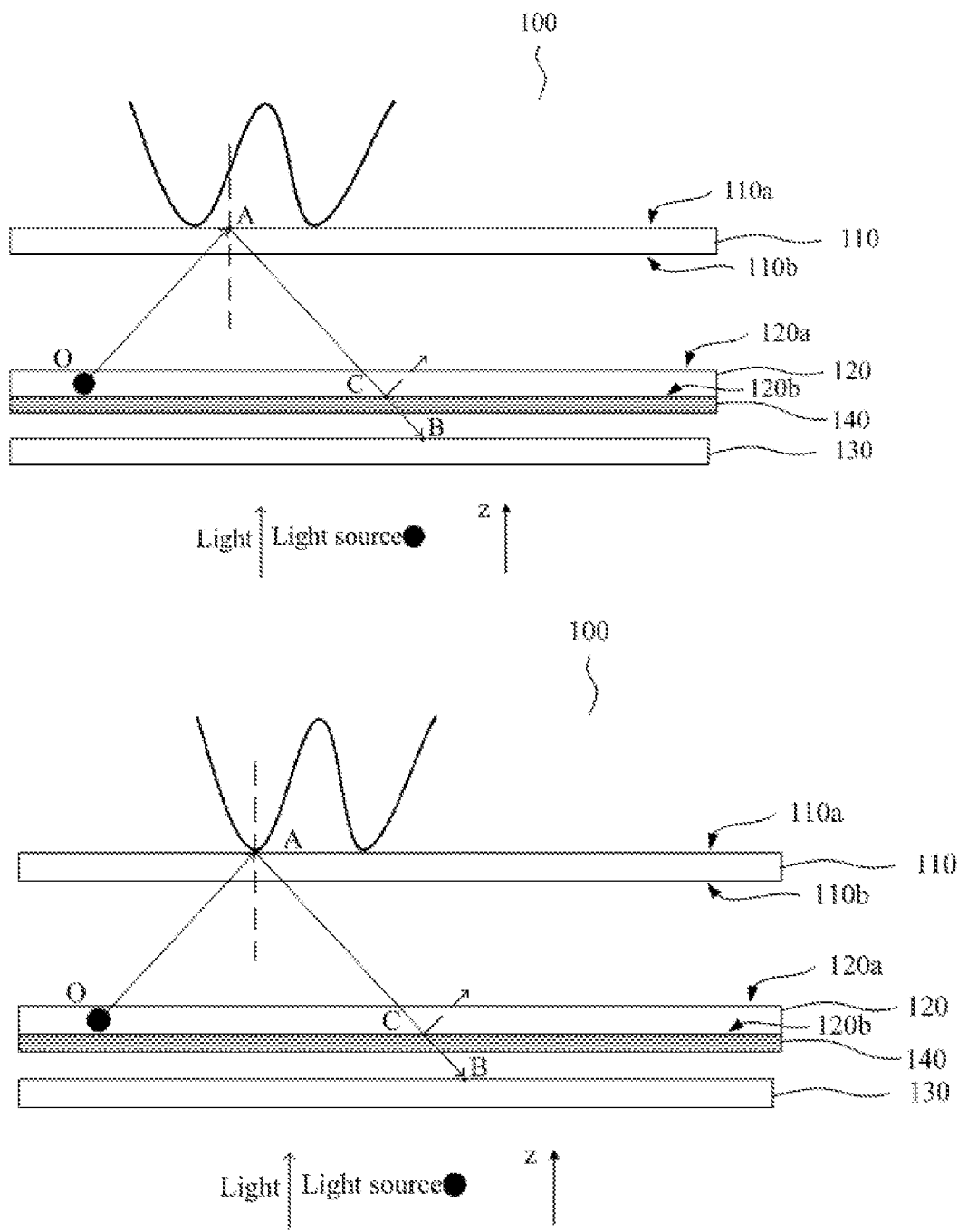
FIG. 3 is a schematic view of an image capturing apparatus according to another embodiment of the present disclosure.

FIG. 3 is a schematic view of an image capturing apparatus according to another embodiment of the present disclosure. Specifically, referring to FIG. 3, the image capturing apparatus 100 may include: a nonopaque cover plate 110, a light source module 120 and a sensor module 130. The nonopaque cover plate 110 has a first surface 110a and a second surface 110b opposite to each other in a thickness direction (in z direction as shown), and the first surface 110a of the light nonopaque cover plate 110 is opposite to the object to be captured. The light source module 120 has a first surface 120a and a second surface 120b in a thickness direction (in z direction as shown), and the first surface 120a of the light source module faces the second surface 110b of the nonopaque cover plate 110. The sensor module 130 is disposed on the second surface 120b of the light source module 120.

In some embodiments, the sensor module 130 may be formed by a plurality of sensor components 131 coupled together, and the plurality of sensor components 131 may be disposed on a same plane.

More specifically, the image capturing apparatus 100 may also include a scattering layer 140 for scattering an incident light. The scattering layer 140 covers the second surface 120b of the light source module 120 and is disposed between the light source module 120 and the sensor module 130.

Referring to FIG. 3, when a finger presses on the first surface 110a of the nonopaque cover plate 110, according to the principle of total reflection, a light emitted from the optical element O is totally reflected at point A, and the light after totally reflected is incident on point C of the light source module 120.

In order to prevent the secondary total reflection of the incident light at point C, the image capturing apparatus 100 according to some embodiments further includes the scattering layer 140 covering the second surface 120b of the light source module 120, so that the incident light is scattered at point C instead of being totally reflected. Because a propagation direction of the scattered light changes, the total reflection condition of the incident light at point C is destroyed. Therefore, the incident light can reach point B on the sensor module 130 smoothly, and is successfully received by the sensor module 130.

In some embodiments, the scattering layer 140 may be made of a material including an optical adhesive filled with scattering particles. Further, the scattering particles may be uniformly filled in the optical adhesive to ensure that the incident light emitting to any point of the light source module 120 may be scattered when entering the scattering layer 140. Specifically, the optical adhesive may be an optical clear adhesive (OCA).

In some embodiments, the scattering particles may be air bubbles or nanomaterials.

Further, different from air bubbles generated due to a fitting process factors in the existing technology, the air bubbles filled as scattering particles in some embodiments can be understood as air particles, and the diameter of the air particles is small enough to change physical properties, so as to ensure that the incident light emitting to the air particles will not be reflected.

For example, the nanomaterials may include nanoparticles such as zinc oxide (ZnO), zirconia (ZrO), chromium oxide (CrO).

The solution according to some embodiments makes a refractive index of the scattering layer 140 unevenly distributed and different from a refractive index of the light source module 120 by uniformly filling the scattering layer 140 with particles of low refractive index (such as the air bubbles) or high refractive index (such as oxide nanoparticles) so as to ensure that the incident light is scattered on the scattering layer 140 instead of being totally reflected. In some embodiments, the scattering particles have a diameter that is less than one fifteenth of a wavelength of the incident light, so that the incident light occurs Rayleigh scattering, which is beneficial to ensure the transparency of light. For example, when the incident light is green light, the diameter of the scattering particles may be within 35 nm.

Further, when the incident light includes light in a plurality of wave bands, the diameter of the scattering particles may be determined according to a minimum wavelength.

Alternatively, the diameter of the scattering particles may be determined according to an average wavelength.

In some embodiments, the greater the filling density of the scattering particles in the optical adhesive, the stronger the scattering of the incident light.

In some embodiments, the filling density and diameter of the scattering particles are suitable for ensuring that the incident light is scattered without being too dense to block the transmission of the incident light.

In some embodiments, the scattering layer 140 has a thickness less than 500 microns in the z direction, so as to ensure the scattering effect and facilitate the miniaturization of the apparatus.

In some embodiments, the sensor module 130 may be adhered to one side of the scattering layer 140 away from the light source module 120. That is, there may be no air gap between the sensor module 130 shown in FIG. 3 and the scattering layer 140, so as to further reduce the possibility of secondary total reflection of the incident light between the scattering layer 140 and the sensor module 130.

In some embodiments, there may be an air gap between the sensor module 130 and the side of the scattering layer 140 away from the light source module 120, as shown in FIG. 3. Such a design is conducive to improving the flexibility of the position setting between the components in the image capturing apparatus 100 and reducing the thickness of the scattering layer 140.

Due to a poor light transmittance of the second surface 120b of the light source module 120, after ensuring that the incident light incident on the point C is scattered through the scattering layer 140 and passes through the second surface 120b of the light source module 120 and the scattering layer 140, even if the incident light is reflected by the air gap between the sensor module 130 and the scattering layer 140, the incident light will be reflected when reaching the second surface 120b of the light source module 120 again and finally reach the sensor module 130.

From above, the solution according to some embodiments can effectively prevent the secondary total reflection and ensure that the signal light can be successfully incident on the sensor module. Specifically, the design of the scattering layer can effectively reduce the probability of total reflection of the incident light on the second surface of the light source module, thus making it possible to prevent the secondary total reflection.

In some embodiment, the image capturing apparatus 100 may be applied to an electronic equipment such as a mobile phone, a smart bracelet, a wrist watch, etc.

At present, a common uniform illumination light source cannot meet the needs of the total reflection imaging principle, and a light source array is a necessary light source for a non-lens optical under-screen fingerprint imaging scheme. However, existing image capturing apparatus can only capture a single image under the screen. In order to obtain a complete fingerprint image, it needs to capture more times of images, and thus the efficiency of fingerprint collection is low.

Figure 4:
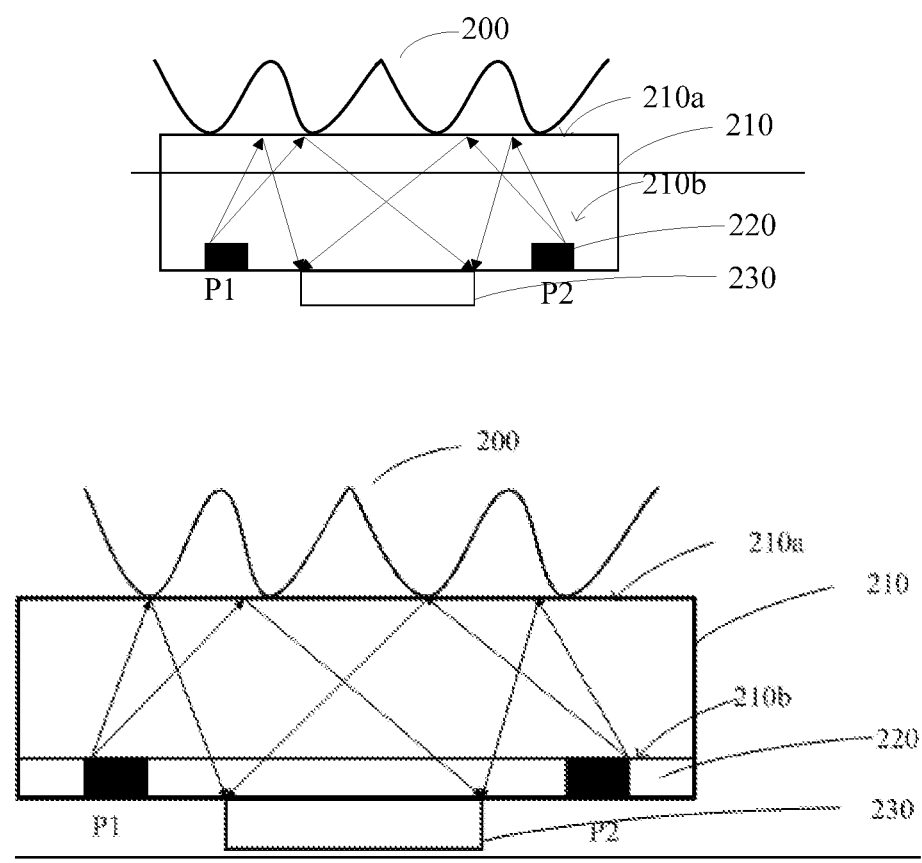
FIG. 4 is a schematic view of an image capturing apparatus according to yet another embodiment of the present disclosure.
Figure 5:
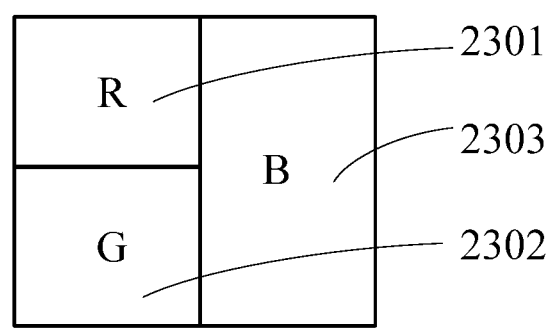
FIG. 5 is a schematic view of a sensor module in FIG. 4.

In order to improve the efficiency of fingerprint collection, another embodiment of the present disclosure provides an image capturing apparatus. FIG. 4 is a schematic view of an image capturing apparatus 200, and FIG. 5 is a schematic view of a sensor module in FIG. 4. The image capturing apparatus 200 may include a nonopaque cover plate 210, a light source module 220, and a sensor module 230. The nonopaque cover plate 210 has a first surface 210a and a second surface 210b opposite to each other. The light source module 220 is disposed below the second surface 210b of the nonopaque cover plate 210. The light source module 220 includes a plurality of optical elements, indicated by P1 and P2 as shown in FIG. 4. The sensor module 230 is disposed below the light source module 220. The sensor module 230 includes a plurality of photosensitive units, and each photosensitive unit includes a plurality of photosensitive areas configured to be sensitive to light in a plurality of wave bands.

In some embodiments, the sensor module 230 may include a plurality of photosensitive units (not shown), which may be separately disposed below the light source module 220, and each photosensitive unit includes a plurality of photosensitive areas configured to be sensitive to light in a plurality of wave bands. Specifically, each photosensitive unit may include a red light sensitive area 2301, a green light sensitive area 2302, and a blue light sensitive area 2303. Among them, the red light sensitive area 2301 may be used to collect red light, the green light sensitive area 2302 may be used to collect green light, and the blue light sensitive area 2303 may be used to collect blue light. The sensor module 230 according to the embodiment shown in FIG. 5 may also be applied to the image capturing apparatus 100 according to the embodiment shown in FIG. 1 or the image capturing apparatus 100 according to the embodiment shown in FIG. 3.

In some embodiments, the color of the light emitted from the optical element included in the light source module 220 of the image capturing apparatus 200 may be white, and the white light may be decomposed into multiple colors. After the light is obtained by the sensor module 230, the light is identified as different colors through different photosensitive areas. The nonopaque cover plate 210 and the light source module 220 of the image capturing apparatus may be connected with each other by filling an optical adhesive, which can prevent the air from affecting the reflection of the light. The refractive index of the optical adhesive should be equal to the refractive index of the nonopaque cover plate 210 as far as possible to avoid the total reflection of the light between the light source module 220 (such as the display panel) and the nonopaque cover plate 210.

In a specific application scenario of the present disclosure, the principle of total reflection imaging is that when imaging, the finger is in contact with the nonopaque cover plate 210, because there is air in concave portions of a fingerprint, the light whose incidence angle exceeds the critical angle of total reflection will be totally reflected, and the sensor module 230 will collect bright light, while convex portions of the fingerprint will contact the first surface 110*a* of the nonopaque cover plate 210, the light will not be totally reflected, and the sensor module 230 will collect dark light, so that the fingerprint image can be distinguished.

In some embodiments of the present disclosure, the sensor module of the image capturing apparatus includes the plurality of photosensitive units, and each photosensitive unit includes the red light sensitive area, the green light sensitive area and the blue light sensitive area. By setting the plurality of photosensitive areas in each photosensitive unit, the image capturing apparatus can capture multiple images at the same time in a single imaging process. Compared with the existing technology in which only a single image can be captured in a single imaging, the image capturing apparatus according to embodiments of the present disclosure can reduce the number of image capturing when capturing a complete fingerprint image, obtain a complete fingerprint image more quickly, and improve the efficiency of fingerprint collection.

Compared with the sensor module of the image capturing apparatus in the existing technology, which can only identify monochromatic light, the sensor module of the image capturing apparatus according to embodiments of the present disclosure can identify light of multiple colors, and thus can simultaneously collect signal light (carrying fingerprint information) in different wave bands, which increases the number of the images that can be captured at the same time when the image capturing apparatus scans the fingerprint one time for imaging, thereby improving the efficiency of fingerprint collection.

In some embodiments, a plurality of optical elements are arranged in an array.

In some embodiments, a plurality of light sources may be arranged in many ways. Specifically, the plurality of light sources may be point light sources. For example, the plurality of light sources may be arranged uniformly, that is, a distance between each two adjacent light sources is equal, so that the light emitted from each light source is reflected to form the same image, which is convenient for subsequent image processing.

Further, the plurality of optical elements may be arranged in a horizontal arrangement, a longitudinal arrangement or a circular arrangement.

Specifically, the horizontal arrangement means that the plurality of light sources form a plurality of parallel horizontal rows, the longitudinal arrangement means that the plurality of light sources form a plurality of parallel longitudinal rows, and the horizontal rows and the longitudinal rows may be perpendicular to each other. In some embodiments, there may be an angle (such as 60°, etc.) between the horizontal rows and the longitudinal rows. The circular arrangement means that the light sources are disposed in circles whose radius increase in turn with a center of a screen as the center of the circles.

In some embodiments, each photosensitive unit includes a red filter, a green filter and a blue filter. An area for disposing the red filter is the red light sensitive area, an area for disposing the green filter is the green light sensitive area and an area for disposing the blue filter is the blue light sensitive area.

In some embodiments, by setting filters of different colors in the photosensitive unit, different colors in the light can be identified. Specifically, the red filter, the green filter and the blue filter may be configured to form the red light sensitive area, the green light sensitive area and the blue light sensitive area.

In some embodiments, the sensor module includes a thin film transistor sensor, and an area of the blue light sensitive area is larger than that of any of the red light sensitive area and the green light sensitive area.

In some embodiments, because the thin film transistor sensor has a low sensitivity to the blue light, the area of the blue light sensitive area may be set larger to obtain more blue light and ensure the quality of image capturing.

It can be understood that in practical application, the size of the area of the photosensitive area may be set according to the sensitivity of the sensor module to different color light. Specifically, the lower the sensitivity of the sensor module to a certain color light, the larger the area of the photosensitive area sensitive to the color light.

In some embodiments, the plurality of the optical elements have color light sources. In other words, the color of the light emitted by the plurality of optical elements may include red, green and blue, so that different photosensitive areas in the sensor module can identify different colors in the light.

In some embodiments, the light source module may be a liquid crystal display, an active array organic light-emitting diode display or a micro light-emitting diode display.

Another embodiment of the present disclosure also provides an image capturing method, which can be applied to an optical under-screen image processing scene. For example, the image capturing method may be executed by an intelligent device configured with the image capturing apparatus 100, 200 shown in FIG. 1, FIG. 3 and FIG. 4 to obtain an image of the object to be captured which contacts the nonopaque cover plate, wherein the object to be captured may be a finger, and the image may be a fingerprint image.

Figure 6:
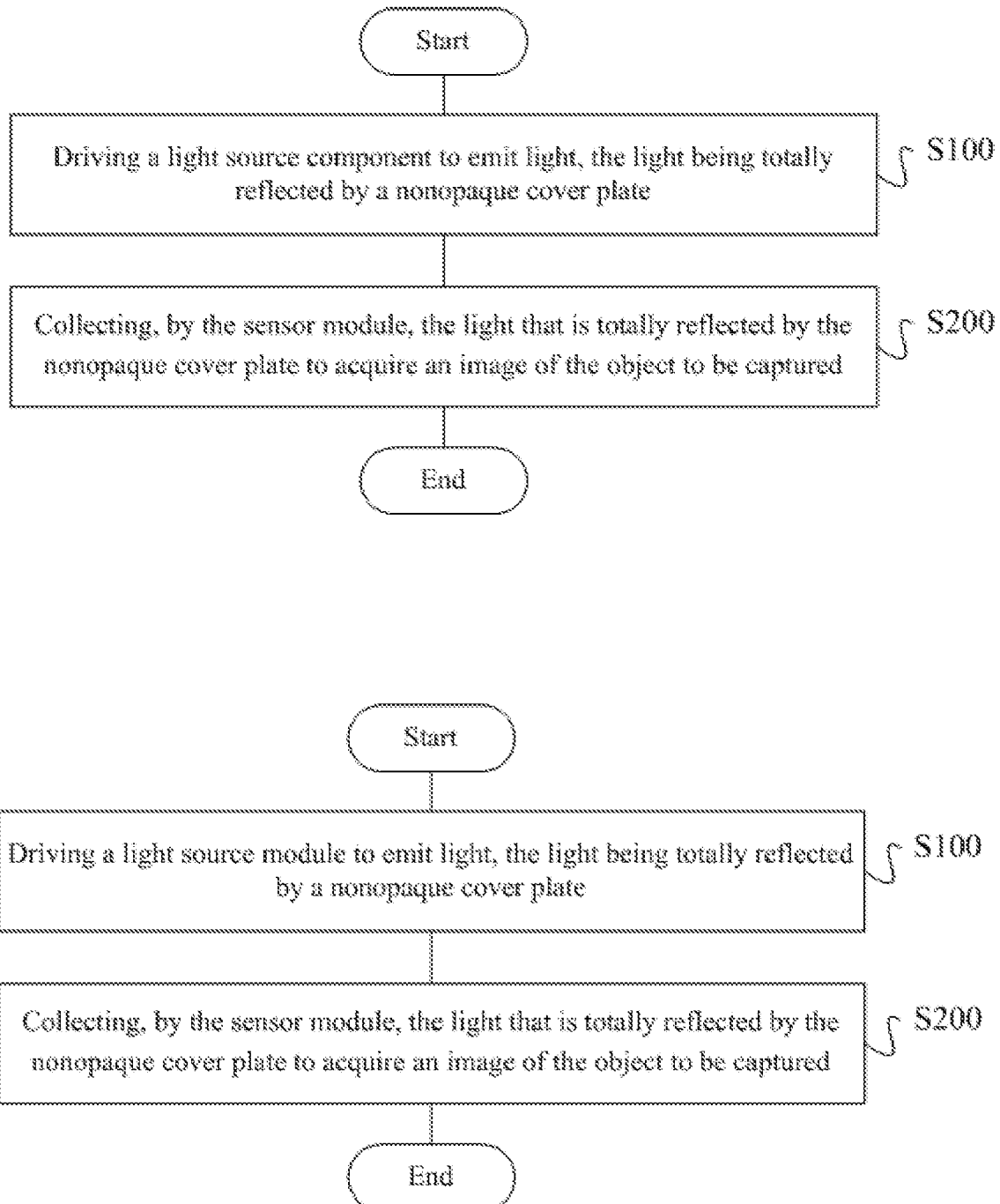
FIG. 6 is a flowchart of an image capturing method according to an embodiment of the present disclosure.

Specifically, with reference to FIG. 6, the image capturing method in this embodiment may include following steps:

S100, driving the light source module to emit light, wherein the light is totally reflected by the nonopaque cover plate; and S200: collecting, by the sensor module, the light that is totally reflected by the nonopaque cover plate to acquire an image of the object to be captured.

Figure 7:
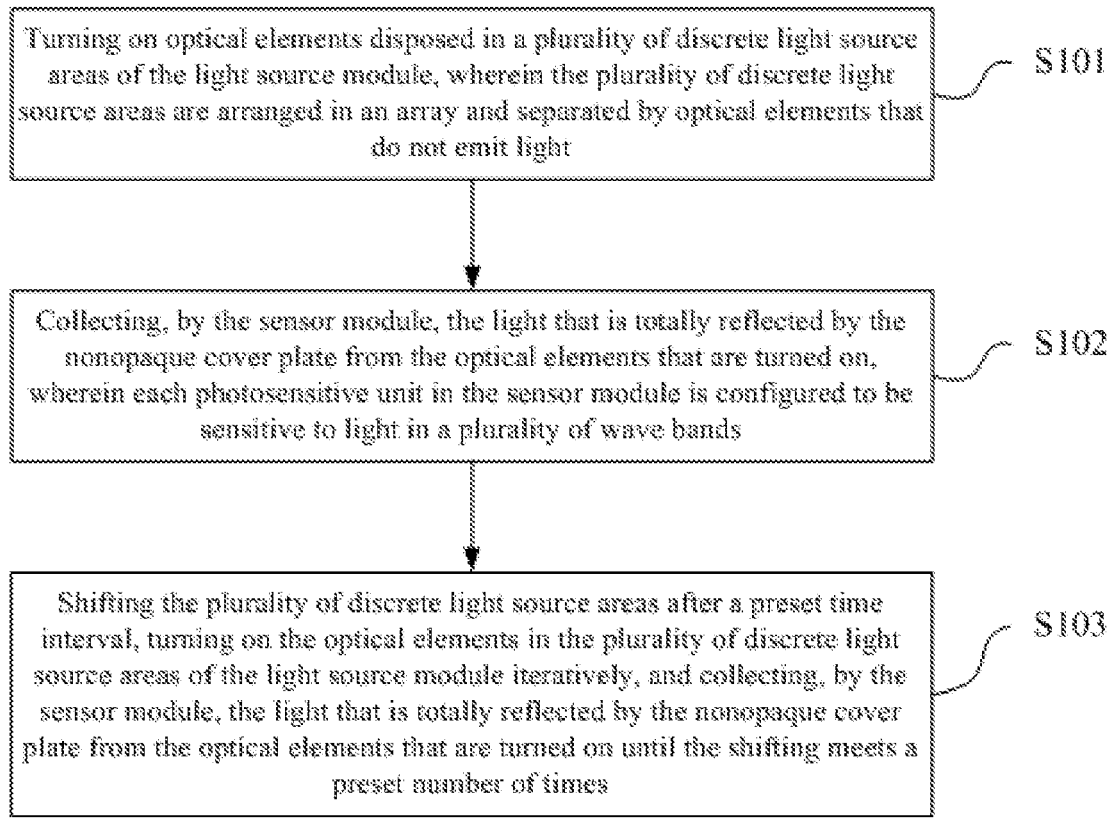
FIG. 7 is a flowchart of a specific embodiment of S100 in the image capturing method in FIG. 6.

In some embodiments, in S100, driving the light source module to emit light may use a conventional existing light emitting method. In some embodiments, as shown in FIG. 7, driving the light source module to emit light in S100 may further include:

S101: turning on optical elements disposed in a plurality of discrete light source areas of the light source module, wherein the plurality of discrete light source areas are arranged in an array and separated by optical elements that do not emit light. Specifically, the light source areas may be point light source areas.

S102: collecting, by the sensor module, the light that is totally reflected by the nonopaque cover plate from the optical elements, wherein each photosensitive unit in the sensor module is configured to be sensitive to light in a plurality of wave bands;

S103: shifting the plurality of discrete light source areas after a preset time interval, turning on the optical elements in the plurality of discrete light source areas of the light source module iteratively and collecting, by the sensor module, the light that is totally reflected by the nonopaque cover plate from the optical elements until the shifting meets a preset number of times.

It should be noted that the sequence number of each step in some embodiments does not represent a limitation on the execution order of each step.

In some embodiments, by turning on the optical elements in the plurality of discrete light source areas at the same time, a large amount of image information can be acquired each time, and then through multiple shiftings, light data including all under-screen images can be acquired.

Specifically, the optical elements in the plurality of light source areas may emit red light, green light, and blue light, respectively.

More specifically, each time the light source areas are lighted and the light is collected by the sensor module 130, that is, each time S101 and S102 are performed, since each photosensitive unit in the sensor module 130 includes the red light sensitive area, the green light sensitive area and the blue light sensitive area, each photosensitive unit can identify red, green and blue in the light. In this case, a single scan imaging process can obtain three images, namely a red image, a green image and a blue image.

In some embodiments, an operation for determining whether the preset number of times has been performed may be performed after each light collecting, and before the shifting, in order to avoid useless shifting and further improve the efficiency of fingerprint collection.

Further, the image capturing method also includes the following steps: acquiring image data by stitching light data acquired by the light sensor module.

In some embodiments, since only part of the fingerprint can be collected in a single scanning process, that is, the process of S101 and S102, the image corresponding to the light data obtained by multiple scanning (that is, the image obtained by S103) can be stitched to obtain a complete image data.

In practical application, in order to realize image stitching, the image data of each collected light may also be preprocessed, for example, the acquired image data may be zoomed, and invalid image data may be removed, so as to obtain an effective image area of each collected light data. Thus, the complete image data can be obtained by stitching these effective image areas. When stitching, the same parts of the image areas are overlapped, so that different parts of the image areas can be extended until the whole image is obtained.

In some embodiments, a shifting direction is from a light source area to an adjacent light source area, and a distance of the shifting is 1/n (n is a positive integer) of a spacing distance between adjacent light source areas.

In some embodiments, the shifting is to obtain missing image information. In order to facilitate the subsequent image stitching, the distance of each shifting may be equal. In some embodiments, the shifting direction is from a light source to an adjacent light source, and the distance of the shifting is 1/n (n is a positive integer) of the spacing distance between adjacent light source areas. For example, the distance of each shifting is one third or one eighth of a spacing distance between centers of adjacent light source. Therefore, the image data between light sources can be obtained at equal spacing, and same algorithm may be used for image stitching, so the efficiency of image stitching is higher.

In some embodiments, the shifting includes a horizontal shifting, a longitudinal shifting and a direction shifting of ±45°.

In some embodiments, the array of the light sources may include horizontal arrangement and longitudinal arrangement perpendicular to each other. Accordingly, the shifting may include horizontal shifting, longitudinal shifting and direction shifting of ±45°. The horizontal shifting is 1/n (n is a positive integer) of a horizontal spacing distance between the adjacent light source areas, the longitudinal shifting is 1/n (n is a positive integer) of a longitudinal spacing distance between the adjacent light source areas, and the direction shifting of ±45° is 1/n (n is a positive integer) of a spacing distance between the adjacent light source areas in this direction. The total times of light collecting is the times of horizontal light collecting times the times of longitudinal light collecting. The more times the shifting, the more times the light is collected, the more image information is collected, but the longer the collecting time is. In order to save time, it is necessary to reduce the times of the shifting as much as possible on the premise of the whole image stitching. This requires more image information to be collected each time the light is collected, and the image capturing apparatus according to some embodiments can meet this requirement. Taking collecting 30 images as an example, the existing technology needs to scan 30 times, while the present disclosure only needs to scan 10 times, which greatly improves the capturing efficiency.

In some embodiments, the light source area is quasi-circular.

In some embodiments, the shape of the light source will also affect the presentation quality of the fingerprint image. In practical applications, each light source is square, and the combination of multiple light sources cannot form a standard circle, and can only be a quasi-circular. The quasi-circular light source area can be determined by drawing a circle with a certain light source as the center of the circle, and all the light sources in the circle can be used as quasi-circular light sources. A preset area ratio value can be set for the light sources on the circumference, and if the area ratio of a light source on the circumference to the total area of the pixels is greater than the preset area ratio value, the light source may be regarded as the quasi-circular light source. The size of the circle determines the light intensity of the light source area and whether the sensor module can obtain a higher quality image. If the circle is too small, the light source area is too small, which will cause insufficient light, and if the circle is too large, the light source area is too large, which will affect the imaging quality. Different display panels also have different light source intensities, and the size of the light source areas of different display panels will also be different. For a specific image imaging capturing structure, the size of the light source area can also be obtained by manual multiple experiments. The size of the light source area can be lighted sequentially from small to large, the sensor module obtains the image data, and then a minimum light source area that satisfies the imaging quality can be filtered manually.

In some embodiment of the present disclosure, the spacing distance between two adjacent light sources satisfies the condition that the total reflection images of the light sources captured by the sensor module are not in contact or repeated.

In some embodiments, the spacing distance between the light sources will affect the imaging quality or calculation amount. For example, if the spacing distance between the light sources is relatively small, the total reflection image of a single light source will overlap in a light collecting, and then it is also necessary to remove overlapping parts when stitching the images, which will increase the workload of stitching the images each time. In order to avoid overlapping between the images obtained by different scans, the spacing distance between two adjacent light sources satisfies the condition that the total reflection images of the light sources captured by the sensor modules are not in contact or repeated. Further, the spacing distance between the light sources may have a minimum value under the condition that the total reflection images of the two adjacent light sources are not in contact or repeated. This minimum value can be obtained through manual multiple experiments. For example, the total reflection image of the light source is obtained under different spacing distances between the light sources, and then the minimum value of the spacing distance between the light sources under the condition that the total reflection images are not in contact or repeated is checked. This minimum value can then be preset on the memory running the method. In practice, the spacing distance between the light sources will be affected by hardware parameters of the imaging structure such as display panel, light sensor, and nonopaque cover plate, etc. In practical applications, screen hardware parameters of a product will generally not change, thus manual multiple experiments are more direct and convenient for specific screens.

With reference to FIG. 8, in some embodiments, the sensor module is formed by a plurality of sensor components coupled together, and collecting the light that is totally reflected by the nonopaque cover plate through the sensor module to acquire an image of the object to be captured in S200 includes:

S201: acquiring images respectively captured by the plurality of sensor components 131, wherein each image is a partial image of the object to be captured;

S202: stitching the acquired images to obtain the image of the object to be captured.

In some embodiments, the second surface of the light source module is covered with a scattering layer, and the scattering layer is configured to scatter an incident light.

In some embodiments, the plurality of sensor components 131 are disposed on the same plane, as shown in FIG. 2. Correspondingly, referring to FIG. 9, S202 may include the following steps:

S2021: for each sensor component, determining a position of the image captured by each sensor component in the image of the object to be captured according to a position of each sensor component in the plane; and S2022, stitching the images respectively captured by the plurality of sensor components according to the determined position to obtain the image of the object to be captured.

Referring to FIG. 2, taking the sensor component 131 in an upper left corner as an example, according to a position of the sensor component 131 in the sensor module 130 composed of the plurality of sensor components 131, it can be determined that the image captured by the sensor component 131 is the image of an upper left corner of the image of the object to be captured.

Similarly, the image captured by the sensor component 131 in an upper right corner is the image of an upper right corner of the image of the object to be captured.

Similarly, the image captured by the sensor component 131 in a lower left corner is the image of a lower left corner of the image of the object to be captured.

Similarly, the image captured by the sensor component 131 in a lower right corner is the image of a lower right corner of the image of the object to be captured.

Thus, by stitching the images captured by the sensor components 131 according to the positions of the sensor components 131 on the plane, the image of the object to be captured can be obtained.

In some embodiments, referring to FIGS. 1 and 2, the plurality of sensor components 131 capture images when the light source module 120 emits light, wherein the light source module 120 includes a plurality of optical elements O arranged in an array, a part of the plurality of optical elements that emit light are shifted during different capturing periods, and the part of the plurality of optical elements sequentially emit light in each capturing period.

Accordingly, referring to FIG. 10, after S2022, S202 may further include the following steps:

S2023: acquiring a plurality of images of the object to be captured which are respectively stitched during the plurality of capturing periods, wherein there is a preset offset in a first direction between a position of the image of the object to be captured which is stitched in a current capturing period and a position of the image of the object to be captured which is stitched in a previous capturing period, and the first direction is parallel to a shifting direction of the part of the plurality of optical elements that emit light;

S2024: determining the image of the object to be captured which is stitched in each capturing period as a to-be-processed image;

S2025: shifting a plurality of to-be-processed images in a second direction to align the plurality of to-be-processed images and obtain a processed image, wherein the second direction is consistent with the first direction; and S2026, generating a target image of the object to be captured based on the processed images.

For example, referring to FIG. 1, it is assumed that the optical element O2 belongs to a light-emitting array and the optical element O1 belongs to a non-light-emitting array in a first capturing period. According to the principle of total reflection, the light emitted from the optical element O2 is irradiated to point C after total reflection. However, point C is the junction of two adjacent sensor components 131, so the image of point A3 cannot be imaged at point C, resulting in a blank area in the image of the object to be captured which is stitched in the first capturing period at point A3. Next, the image of the object to be captured which is stitched in the first capturing period is recorded as a to-be-processed image 1.

It is assumed that the shifting of the optical elements O is from right to left in the figure, the light-emitting position is shifted from the optical element O2 to the optical element O1 in the second capturing period. According to the principle of total reflection, the light emitted from the optical element O1 is imaged to point B3 on the surface of the sensor component 131 in the right side of the figure after total reflection. As a result, the image of point A3 can be imaged at point B3, so that point A3 in the image of the object to be captured in the second capturing period has image content. Next, the image of the object to be captured which is stitched in the second capturing period is recorded as a to-be-processed image 2.

Further, there is also a blank area at the position corresponding to point C in the to-be-processed image 2, and a theoretical imaging at the position corresponding to point C in the to-be-processed image 2 and a theoretical imaging at the position corresponding to point C in the to-be-processed image 1 have a corresponding shift relationship. Therefore, by shifting and aligning the to-be-processed images stitched in multiple capturing periods, all blank areas can be filled to obtain a complete image of the object to be captured.

Further, according to the principle of total reflection, as the optical elements O are shifted from right to left as shown in FIG. 1, the imaging of the object to be captured on each sensor component 131 is shifted synchronously from left to right. Therefore, in order to align the same areas of the to-be-processed images obtained in each capturing period, it is necessary to shift the to-be-processed image obtained in the following capturing period to a position of the same reference point as the to-be-processed image obtained in the previous capturing period.

Wherein, the reference point may be preset, for example, the position of a leftmost optical element O in the first capturing period is determined as the reference point.

Therefore, in S2025, a shifting direction (i.e., the second direction) of the to-be-processed image and the shifting direction of the optical elements O (i.e., the first direction) are the same direction. For example, the to-be-processed image 2 is shifted leftwards to be aligned with the to-be-processed image 1, such that outer contours of the two images are aligned.

Thus, after the to-be-processed images obtained in each capturing period are respectively shifted to be aligned with each other, the blank areas in other to-be-processed images can be complemented based on different to-be-processed images, thereby obtaining a complete image of the object to be captured.

Figure 11:
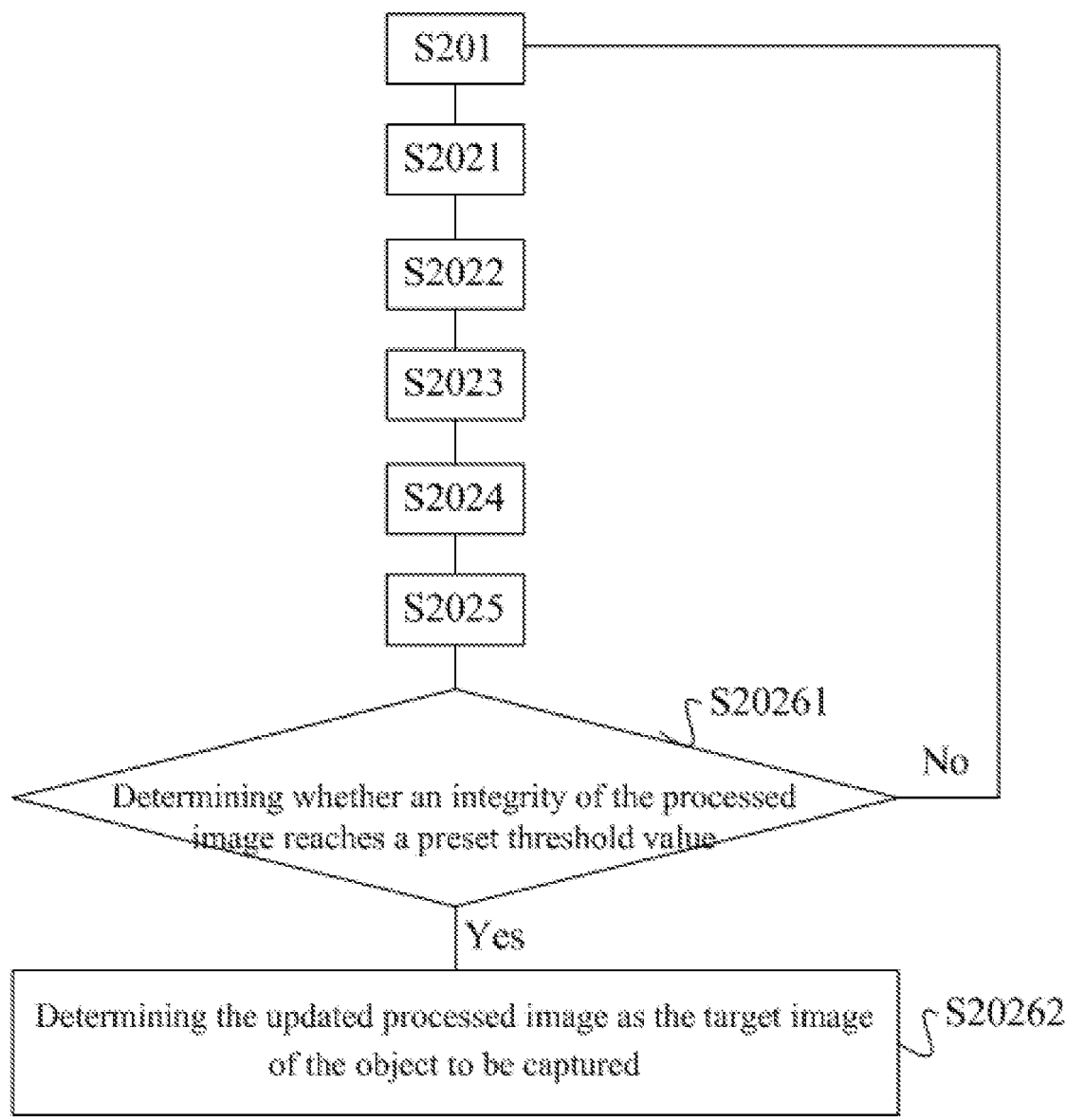
FIG. 11 is a flowchart of a specific embodiment of S2026 in FIG. 10.

Further, referring to FIG. 11, S2026 may include the following steps:

S20261, determining whether an integrity of the processed image reaches a preset threshold value.

If a determining result of S20261 is no, that is, if the integrity of the processed image is less than the preset threshold value, S201 to S2026 are performed again for the next capturing period of image capturing, and the captured image are shifted in the second direction to be aligned with the processed image to obtain an updated processed image.

Further, S20261 is repeatedly executed to determine whether the integrity of the updated to-be-processed image reaches the preset threshold value until the integrity of the updated processed image reaches the preset threshold value.

S20262, determining the updated processed image as the target image of the object to be captured.

Figure 12:
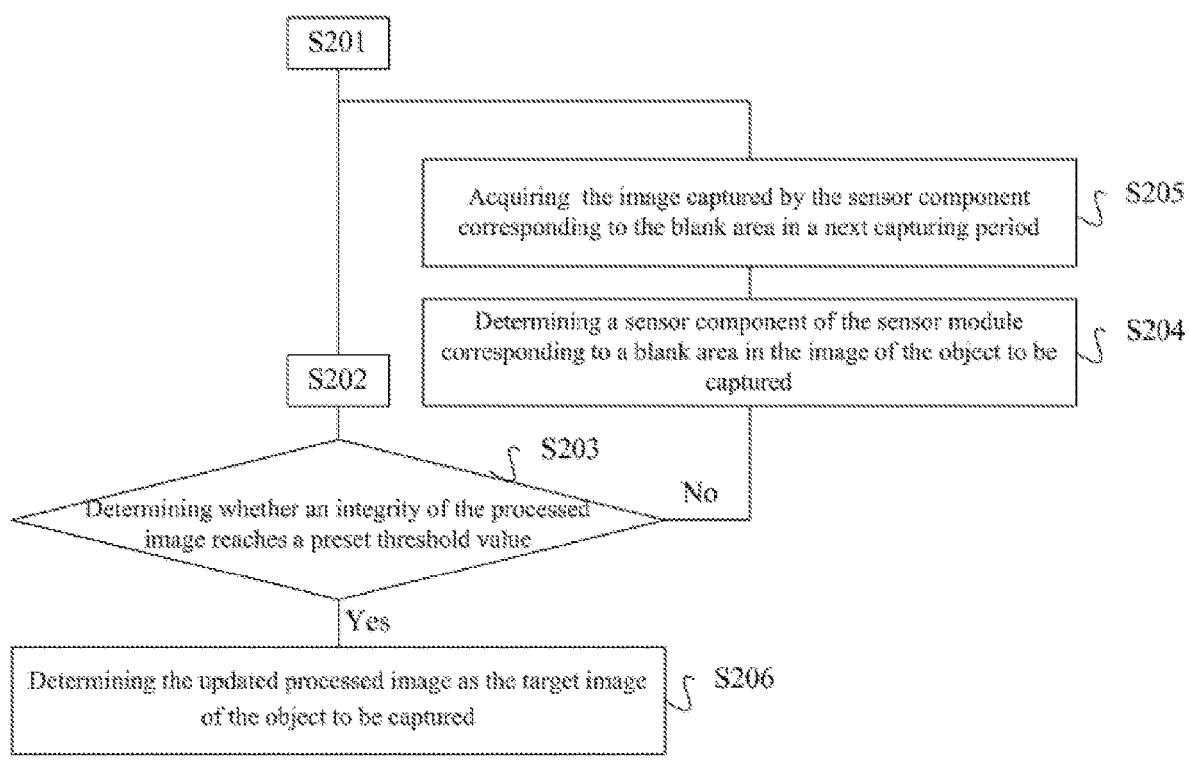
FIG. 12 is a flowchart of another specific embodiment of S200 in the image capturing method in FIG. 6.

In some embodiments, referring to FIG. 12, after S202, the image capturing method in some embodiments may further include the following steps:

S203: determining whether an integrity of the processed image reaches a preset threshold value.

If a determining result of S203 is no, that is, if the integrity of the image of the object to be captured is less than the preset threshold value, S204 is executed to determine the sensor component 131 corresponding to the blank area in the image of the object to be captured.

S205: acquiring the image captured by the sensor component 131 corresponding to the blank area in a next capturing period, and repeatedly performing S202 to stitch the acquired image with the image of the object to be captured to obtain an updated image of the object to be captured.

Further, S203 is repeatedly executed to determine whether the integrity of the updated image of the object to be captured reaches the preset threshold; if the integrity of the updated image of the object to be captured reaches the preset threshold, S206 is executed to determine the updated image of the object to be captured as the target image of the object to be captured.

Thus, since each sensor component 131 is independently controlled and independently outputs data, when the stitched image of the object to be captured has partial loss, the solution of this embodiment can control the sensor component 131 corresponding to the loss in the next capturing period to separately output the image and stitch it with the image of the object to be captured that is stitched in all previous capturing periods to complete the image of the object to be captured. Further, during the next capturing period, other sensor components 131 may be in a sleep state to save power consumption of the image capturing apparatus 100 and intelligence devices.

Specifically, the preset threshold value may be 90%. In practical applications, those skilled in the art can adjust specific preset threshold value as needed to meet the requirements of different intelligence devices for device security and fingerprint identification accuracy.

In a variation, the embodiments shown in FIG. 11 and FIG. 12 may be combined to obtain a new embodiment, thereby flexibly adapting to diverse application scenarios.

For example, if the determining result of the step S20261 indicates that the integrity of the processed image is less than the preset threshold value and the blank areas are concentrated, S204 and S205 may be executed to separately obtain the images captured by the sensor components 131 corresponding to the blank areas during the next capturing period and stitch the images with the processed image until the integrity of the updated processed image reaches the preset threshold value.

In the fingerprint unlocking scenario, the images of the object to be captured that are stitched in a small number of capturing periods may be first shifted and aligned to obtain the processed image. When the integrity of the processed image has reached the preset threshold value, it can be determined that the fingerprint identification is successful, and then the unlock operation is completed.

However, if the integrity of the processed image obtained based on a small number of capturing periods is less than the preset threshold value, the image capturing and processing operation may be continued in the next capturing period until the integrity of the updated processed image reaches the preset threshold value.

In a typical application scenario, in a fingerprint input phase, 10 to 20 capturing periods may be needed, and in the fingerprint unlocking phase, 3 to 4 capturing periods may be needed.

Thus, the images respectively captured by the plurality of sensor components 131 may be stitched together to accurately synthesize a complete image of the object to be captured, thereby avoiding image distortion or partial loss.

Figure 13:
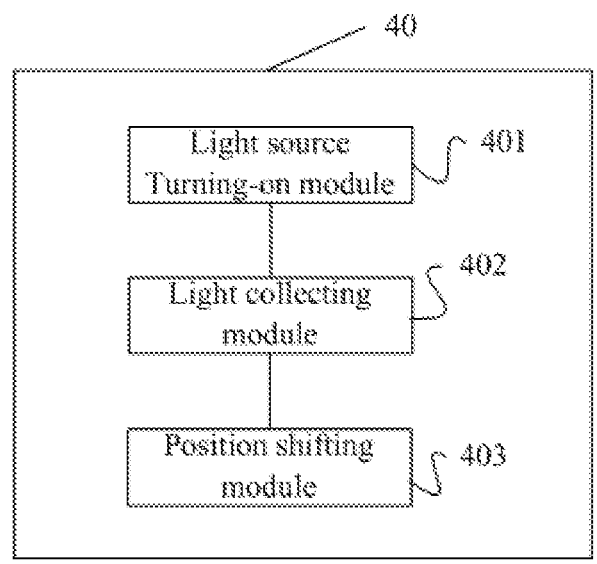
FIG. 13 is a schematic view of an image capturing apparatus according to still another embodiment of the present disclosure.

Another embodiment of the present disclosure provides an image capturing apparatus 40. Referring to FIG. 13, the image capturing apparatus 40 may include:

a light source turning-on module 401 for turning on optical elements in a plurality of discrete light source areas of a light source module, wherein the plurality of discrete light source areas are arranged in an array and separated by optical elements that do not emit light;

a light collecting module 402 for collecting, by the sensor module, light that is totally reflected by the nonopaque cover plate, and each photosensitive unit in the sensor module can identify red, green and blue in the light; and a position shifting module 403 for shifting the plurality of discrete light source areas after a preset time interval, turning on the optical elements in the plurality of discrete light source areas of the light source module iteratively, and collecting, by the sensor module, the light that is totally reflected by the nonopaque cover plate from the optical elements that are turned on until the shifting meets a preset number of times.

For more details on the working principle and working mode of the image capturing apparatus 40, reference may be made to the relevant description of the aforementioned embodiments, which will not be repeated here.

Figure 14:
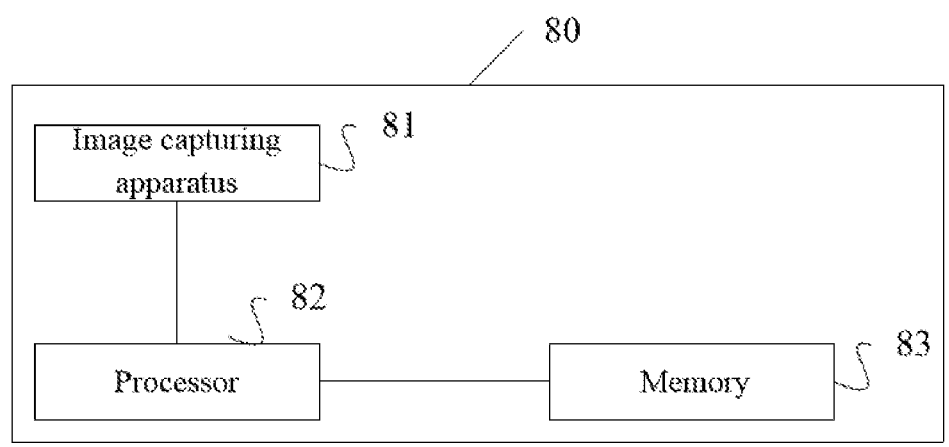
FIG. 14 is a structural block diagram of an electronic equipment according to an embodiment of the present disclosure.

FIG. 14 is a structural block diagram of an electronic equipment according to an embodiment of the present disclosure. Specifically, the electronic equipment 80 may include: an image capturing apparatus 81, a processor 82 coupled with the image capturing apparatus 81 and a memory 83 having computer instructions stored thereon. The computer instructions are executed by the processor 82 to perform steps of the image capturing method according to the embodiments of the present disclosure.

Further, for the structure and function of the image capturing apparatus 81, reference may be made to the relevant description of the image capturing apparatus 100, which is not repeated herein.

In some embodiments, the electronic equipment 80 may have an optical under-screen fingerprint identification function. The image capturing apparatus 81 may include: the nonopaque cover plate 110, the light source module 120 and the sensor module 130, wherein the sensor module is formed by a plurality of sensor components 131 coupled together.

Specifically, the image capturing apparatus 81 can perform imaging based on the principle of total reflection of physical optics, and can obtain the image of the object to be captured on the first surface 110a of the nonopaque cover plate 110 by stitching the images respectively captured by the plurality of the sensor components 131.

In some embodiments, when the computer instructions stored in the memory 83 is executed by the processor 82 to perform the image capturing method according to the embodiments of the present disclosure, the image captured by each sensor component 131 can be acquired first, and then the images can be stitched to obtain the image of the object to be captured.

In some embodiments, a part of the plurality of optical elements that emit light are shifted during different capturing periods, and the part of the plurality of optical elements sequentially emit light in each capturing period. Accordingly, when the computer instructions are executed by the processor 82 in the image capturing method according to the embodiment of the present disclosure, the computer instructions are also executed to: realize the shifting and aligning of the images of the object to be captured which are stitched in the plurality of capturing periods respectively to obtain the target image of the object to be captured.

In some embodiments, the electronic equipment 80 may be a terminal device such as a mobile phone, a computer, a tablet computer, or a smart bracelet, a wrist watch, etc.

Another embodiment of the present disclosure also provides a storage medium having computer instructions (also be referred to as computer program) stored thereon, wherein the computer instructions are executed to perform steps of the mage capturing method according to the embodiments of the present disclosure. The storage medium may include ROM, RAM, disk or optical disc, etc. The storage medium may also include a non-volatile memory or a non-transitory memory and the like.

Although the present disclosure has been disclosed above, the present disclosure is not limited thereto. Any changes and modifications may be made by those skilled in the art without departing from the spirit and scope of the present disclosure, and the scope of the present disclosure should be determined by the appended claims.

The invention claimed is:

1. An image capturing apparatus, comprising:
    a nonopaque cover plate having a first surface and a second surface opposite to each other in a thickness direction of the nonopaque cover plate, wherein the first surface of the nonopaque cover plate is opposite to an object to be captured;
    a light source module having a first surface and a second surface opposite to each other in a thickness direction of the light source module, wherein the first surface of the light source module is opposite to the second surface of the nonopaque cover plate; and
    a sensor module disposed on the second surface of the light source module;
    wherein the sensor module comprises a plurality of sensor components coupled together, and each sensor component is independently controlled and independently outputs data.

2. The image capturing apparatus according to claim 1, the plurality of sensor components are disposed on a same plane.

3. The image capturing apparatus according to claim 2, wherein adjacent edges of adjacent sensor components of the plurality of sensor components are attached to each other.

4. The image capturing apparatus according to claim 1, further comprising:
    a scattering layer, covering the second surface of the light source module for scattering an incident light.

5. The image capturing apparatus according to claim 4, wherein the scattering layer is made of a material comprising an optical adhesive filled with scattering particles.

6. The image capturing apparatus according to claim 5, wherein each scattering particle has a diameter less than one fifteenth of a wavelength of the incident light.

7. The image capturing apparatus according to claim 1, wherein the sensor module comprises a plurality of photosensitive units, and each photosensitive unit comprises a plurality of photosensitive areas configured to be sensitive to light in a plurality of wave bands.

8. The image capturing apparatus according to claim 7, wherein each photosensitive unit comprises a red light sensitive area, a green light sensitive area, and a blue light sensitive area.

9. The image capturing apparatus according to claim 8, wherein the sensor module comprises a thin film transistor sensor, and the blue light sensitive area has an area larger than that of any of the red light sensitive area and the green light sensitive area.

10. The image capturing apparatus according to claim 1, wherein the light source module comprises a plurality of optical elements arranged in an array, a part of the plurality of optical elements that emit light are shifted during different capturing periods, and the part of the plurality of optical elements sequentially emit light in each capturing period.

11. The image capturing apparatus according to claim 1, wherein each sensor component can output data simultaneously and in parallel.

12. The image capturing apparatus according to claim 1, wherein the nonopaque cover plate performs imaging based on a total reflection principle of physical optics, and an image formed by a total reflection on the nonopaque cover plate is captured by each sensor component.

13. The image capturing apparatus according to claim 12, wherein in a single capturing period, on the basis of meeting total reflection conditions, the imaging of light emitted from the light source module on the sensor module after the total reflection is distributed on the plurality of sensor components, and the image captured by each sensor component is a partial image of the object to be captured.

14. An image capturing method applying an image capturing apparatus, wherein the image capturing apparatus comprises:
- a nonopaque cover plate having a first surface and a second surface opposite to each other in a thickness direction of the nonopaque cover plate, wherein the first surface of the nonopaque cover plate is opposite to an object to be captured;
- a light source module having a first surface and a second surface opposite to each other in a thickness direction of the light source module, wherein the first surface of the light source module is opposite to the second surface of the nonopaque cover plate; and
- a sensor module disposed on the second surface of the light source module;

the image capturing method comprising:
- driving the light source module to emit light, the light being totally reflected by the nonopaque cover plate; and
- collecting, by the sensor module, the light that is totally reflected by the nonopaque cover plate to acquire an image of the object to be captured;
- wherein the sensor module comprises a plurality of sensor components coupled together, and each sensor component is independently controlled and independently outputs data.

15. The image capturing method according to claim 14, wherein acquiring an image of the object to be captured by the sensor module comprises:
- acquiring images respectively captured by the plurality of sensor components,
wherein each image is a partial image of the object to be captured; and
- stitching the acquired images to obtain the image of the object to be captured.

16. The image capturing method according to claim 15, wherein the plurality of sensor components are disposed on a same plane, and stitching the acquired images to obtain the image of the object to be captured comprises:
- determining a position of the image captured by each sensor component in the image of the object to be captured according to a position of each sensor component in the plane; and
- stitching the images respectively captured by the plurality of sensor components according to the determined position to obtain the image of the object to be captured.

17. The image capturing method according to claim 16, wherein the plurality of sensor components capture the images when the light source module emits light, wherein the light source module comprises a plurality of optical elements arranged in an array, a part of the plurality of optical elements that emit light are shifted during different capturing periods, and the part of the plurality of optical elements sequentially emit light in each capturing period;
stitching the acquired images to obtain the image of the object to be captured further comprises:
- acquiring a plurality of images of the object to be captured which are respectively stitched during the plurality of capturing periods, wherein there is a preset offset in a first direction between a position of the image of the object to be captured which is stitched in a current capturing period and a position of the image of the object to be captured which is stitched in a previous capturing period, and the first direction is parallel to a shifting direction of the part of the plurality of optical elements that emit light;
- determining the image of the object to be captured which is stitched in each capturing period as a to-be-processed image;
- shifting a plurality of to-be-processed images in a second direction to align the plurality of to-be-processed images and obtain a processed image, wherein the second direction is consistent with the first direction; and
- generating a target image of the object to be captured based on the processed image.

18. The image capturing method according to claim 17, wherein generating a target image of the object to be captured based on the processed image comprises:
- determining whether an integrity of the processed image reaches a preset threshold value;
- performing image capturing in a next capturing period and shifting the image captured in the next capturing period in the second direction to align the image captured in the next capturing period with the processed image, to obtain an updated processed image, when the integrity of the processed image is less than the preset threshold value, until an integrity of the updated processed image reaches the preset threshold value; and
- determining the updated processed image as the target image of the object to be captured.

19. The image capturing method according to claim 17, wherein shifting a plurality of to-be-processed images in a second direction to align the plurality of to-be-processed images and obtain a processed image comprises:
- complementing blank areas in other to-be-processed images based on different to-be-processed images to obtain the processed image after the to-be-processed images obtained in each capturing period are respectively shifted to be aligned with each other;
or
- shifting the to-be-processed image obtained in a following capturing period to a position of the same reference point as the to-be-processed image obtained in a previous capturing period.

20. The image capturing method according to claim 14, wherein the second surface of the light source module is covered with a scattering layer, and the scattering layer is configured to scatter an incident light.

21. The image capturing method according to claim 14, wherein driving the light source module to emit light comprises: turning on optical elements disposed in a plurality of discrete light source areas of the light source module, wherein the plurality of discrete light source areas are arranged in an array and separated by optical elements that do not emit light;
- acquiring the image captured by the sensor module comprises: collecting, by the sensor module, the light that is totally reflected by the nonopaque cover plate from the optical elements that are turned on, wherein each photosensitive unit in the sensor module is configured to be sensitive to light in a plurality of wave bands;

shifting the plurality of discrete light source areas after a preset time interval, turning on the optical elements in the plurality of discrete light source areas of the light source module iteratively, and collecting, by the sensor module, the light that is totally reflected by the non-opaque cover plate from the optical elements that are turned on until the shifting meets a preset number of times.

22. The image capturing method according to claim 14, wherein the sensor module comprises a plurality of sensor components, and the image capturing method further comprises:
    determining whether an integrity of the image of the object to be captured reaches a preset threshold value;
    determining a sensor component of the sensor module corresponding to a blank area in the image of the object to be captured when the integrity of the image of the object to be captured is less than the preset threshold value; and
    acquiring the image captured by the sensor component corresponding to the blank area in a next capturing period and stitching the acquired image with the image of the object to be captured to obtain an updated image of the object to be captured until the integrity of the image of the object to be captured reaches the preset threshold value.

23. A storage medium having computer instructions stored thereon, wherein the computer instructions are executed to perform steps of the image capturing method according to claim 11.

24. An electronic equipment comprising a memory having computer instructions stored thereon and a processor, wherein the computer instructions are executed by the processor to perform steps of the image capturing method according to claim 14.

* * * * *